US010289172B2

(12) United States Patent
Yang et al.

(10) Patent No.: US 10,289,172 B2
(45) Date of Patent: May 14, 2019

(54) HOLDING DEVICE (71) Applicant: CHENBRO MICOM CO., LTD., New Taipei (TW)

(72) Inventors: Chao-Chiang Yang, New Taipei (TW); Yu-Ching Weng, New Taipei (TW)

(73) Assignee: CHENBRO MICOM CO., LTD., New Taipei (TW)

( * ) Notice: Subject to any disclaimer, the term of this patent is extended or adjusted under 35 U.S.C. 154(b) by 0 days.

(21) Appl. No.: 16/104,289

(22) Filed: Aug. 17, 2018

(65) Prior Publication Data

US 2019/0057725 A1 Feb. 21, 2019

(30) Foreign Application Priority Data

Aug. 17, 2017 (TW) .............................. 106127981 A (51) Int. Cl.
*G06F 1/18* (2006.01)
*G11B 33/02* (2006.01)

(52) U.S. Cl.
CPC ............ *G06F 1/187* (2013.01); *G11B 33/022* (2013.01)

(58) Field of Classification Search
CPC .............................. G06F 1/187; G11B 33/022
See application file for complete search history.

(56) References Cited

U.S. PATENT DOCUMENTS

| | | | | |
|---|---|---|---|---|
| 5,488,538 A * | 1/1996 | Wakita | .................... | G06F 1/184 361/679.31 |
| 5,682,291 A * | 10/1997 | Jeffries | ................... | G06F 1/184 312/223.2 |
| 5,715,139 A * | 2/1998 | Nakajima | ............. | G06F 1/1616 361/679.55 |
| 6,317,317 B1 * | 11/2001 | Lu | ........................... | G06F 1/184 248/611 |
| 6,373,695 B1 * | 4/2002 | Cheng | ..................... | G06F 1/184 312/223.1 |
| 7,242,554 B1 * | 7/2007 | Lin | ...................... | G11B 25/043 360/137 |

(Continued)

FOREIGN PATENT DOCUMENTS

CN 200983256 Y 11/2007
CN 104345836 A 2/2015
(Continued)

*Primary Examiner* — Binh B Tran
*Assistant Examiner* — Douglas R Burtner
(74) *Attorney, Agent, or Firm* — McClure, Qualey & Rodack, LLP (57) ABSTRACT A holding device includes a frame module and an accommodation unit. The frame module includes a plate body and two lateral plates oppositely disposed on the first plate body. A placement area is collectively defined by the plate body and the lateral plates. Two protrusions are respectively provided on the lateral plates. The accommodation unit includes a tray and two elastic plates. The tray is slidably located within the placement area, and an accommodation space is defined between two opposite sides of the tray. Each elastic plate is elastically connected to one of opposite sides of the tray. When the tray is moved after a load is placed within the accommodation space, the protrusions respectively push the elastic plates towards the accommodation space so that the load is toollessly fastened between the elastic plates.

19 Claims, 11 Drawing Sheets

(56) References Cited

U.S. PATENT DOCUMENTS

| | | | |
|---|---|---|---|
| 7,679,896 B2 | 3/2010 | Deng et al. | |
| 9,158,347 B2* | 10/2015 | Zhang | G06F 1/187 |
| 9,232,679 B1* | 1/2016 | Kuo | H05K 7/1489 |
| 9,468,129 B1* | 10/2016 | Wang | G06F 1/187 |
| 9,715,259 B1* | 7/2017 | Wang | H05K 7/1489 |
| 9,928,882 B1* | 3/2018 | Yang | G11B 33/142 |
| 2008/0013271 A1* | 1/2008 | Peng | G06F 1/187 |
| | | | 361/679.31 |
| 2008/0253078 A1* | 10/2008 | Neukam | G06F 1/183 |
| | | | 361/679.31 |
| 2014/0016262 A1* | 1/2014 | Lo | G06F 1/187 |
| | | | 361/679.33 |
| 2014/0285977 A1* | 9/2014 | Li | G11B 33/128 |
| | | | 361/747 |
| 2015/0043152 A1* | 2/2015 | Zhang | G06F 1/187 |
| | | | 361/679.37 |
| 2015/0083676 A1 | 3/2015 | Peng et al. | |
| 2018/0130504 A1* | 5/2018 | Ueki | G06F 1/16 |
| 2018/0197580 A1* | 7/2018 | Okamoto | G11B 33/128 |

FOREIGN PATENT DOCUMENTS

| | | |
|---|---|---|
| CN | 104375583 A | 2/2015 |
| CN | 104460872 A | 3/2015 |
| JP | 2003-223777 A | 8/2003 |
| TW | M311984 U | 5/2007 |
| TW | I291090 B | 12/2007 |
| TW | I318857 B | 12/2009 |
| TW | 201328526 A1 | 7/2013 |
| TW | M495605 U | 2/2015 |

* cited by examiner

HOLDING DEVICE

RELATED APPLICATIONS

This application claims priority to Taiwan Application Serial Number 106127981, filed Aug. 17, 2017, which is herein incorporated by reference.

BACKGROUND

Field of Disclosure

The present disclosure relates to a holding device. More particularly, the present disclosure relates to a holding device which is able to accommodate and secure an electronic component.

Description of Related Art

In general, a known server device is commonly equipped with a plurality of hard disks which are removably disposed on a supporting rack of the server device for expanding or enhancing the ability of the server device. The hard disks are fastened on the supporting rack with screws, or before the hard disks are fastened on the supporting rack with screws, the hard disks can slide into the supporting rack through guide rails that are installed in the supporting rack. In this way, malfunction of the hard disks in operation due to vibration can be avoided.

However, as mentioned above, since the hard disks are required to be fastened on the supporting rack with screws before the supporting rack is assembled into a chassis of the server device, many user inconveniences will be caused, and installation will be time-consuming. In addition, when the hard disks are installed or removed from the supporting rack, a large number of screws is needed to be tightened or released which complicates the process and causes inconvenient operation.

SUMMARY

An objective of the disclosure is to provide a holding device, which can solve the problems mentioned above.

According to one embodiment, a holding device includes a frame module and an accommodation unit. The frame module includes a first plate body and two first lateral plates. The first lateral plates are respectively disposed on two edges of the first plate body, and oppositely disposed on the first plate body. A placement area is collectively defined by the first plate body and the first lateral plates. Two protrusions faced with each other are respectively provided on the first lateral plates. The accommodation unit includes a tray and two elastic plates. The tray is slidably located within the placement area, and an accommodation space is formed between two opposite sides of the tray. Each of the elastic plates is elastically connected to one of the sides of the tray. When a load is received within the accommodation space, and the tray with the load is moved in a direction, the protrusions of the first lateral plates respectively push the elastic plates towards the accommodation space so that the load is toollessly fastened between the elastic plates.

According to one or more embodiments, the holding device further includes a connecting rod structure. The connecting rod structure is pivotally connected to the tray and the frame module for moving the tray back and forth in the placement area.

According to one or more embodiments, the frame module further includes a subsidiary bracket. The subsidiary bracket supports the tray, and the subsidiary bracket includes the aforementioned first lateral plates. The opposite sides of the tray are disposed between the first lateral plates of the subsidiary bracket.

According to one or more embodiments, the connecting rod structure includes a first pivot shaft, a second pivot shaft, a third pivot shaft, a handle lever and a linkage rib. One end of the linkage rib is pivotally connected to one of the opposite sides of the tray through the first pivot shaft, the other end of the linkage rib is pivotally connected to a part of one end of the handle lever through the second pivot shaft, another part of the one end of the handle lever is pivotally connected to one of the first lateral plates of the subsidiary bracket through the third pivot shaft.

According to one or more embodiments, the frame module further includes a partition frame. The partition frame supports the subsidiary bracket, and the partition frame is fixedly connected to the subsidiary bracket. The subsidiary bracket is located between the partition frame and the tray.

According to one or more embodiments, one of the protrusions and the third pivot shaft are disposed on the same one of the first lateral plates.

According to one or more embodiments, the frame module further includes a partition frame having the first plate body and the first lateral plates. The tray is directly disposed on the partition frame.

According to one or more embodiments, the partition frame further includes a second lateral plate. The second lateral plate is disposed on the first plate body, monolithically formed on the first plate body with the first lateral plates, arranged spaced to the first lateral plates, and disposed at the same one of the opposite sides of the tray with one of the first lateral plates. The connecting rod structure includes a first pivot shaft, a second pivot shaft, a third pivot shaft, a handle lever and a linkage rib, one end of the linkage rib is pivotally connected to one of the opposite sides of the tray through the first pivot shaft, the other end of the linkage rib is pivotally connected to a part of one end of the handle lever through the second pivot shaft, another part of the one end of the handle lever is pivotally connected to the second lateral plate through the third pivot shaft.

According to one or more embodiments, the frame module further includes an external lug. The external lug is detachably disposed on the first plate body, disposed between the partition frame and the tray, arranged spaced to the first lateral plates, and disposed at the same one of the opposite sides of the tray with one of the first lateral plates. The connecting rod structure includes a first pivot shaft, a second pivot shaft, a third pivot shaft, a handle lever and a linkage rib, one end of the linkage rib is pivotally connected to one of the opposite sides of the tray through the first pivot shaft, the other end of the linkage rib is pivotally connected to a part of one end of the handle lever through the second pivot shaft, another part of the one end of the handle lever is pivotally connected to the external lug through the third pivot shaft.

According to one or more embodiments, each of the elastic plates comprises an elastic rib and a bump, one end of the elastic rib is a free end, and the bump is formed on one surface of the elastic rib facing towards the accommodation space. When the load is fastened between the elastic plates, the bumps directly connect two opposite sides of the load.

According to another embodiment, a holding device includes a frame module, a circuit backplane and an accommodation unit. The frame module includes a first plate body and two first lateral plates disposed on the first plate body oppositely. The first plate body and the first lateral plates collectively define a placement area, and one surface of each of the first lateral plates which faces towards the placement area is provided with a protrusion portion. The accommodation unit includes a tray, a hard disk and two elastic plates. The tray is slidably located within the placement area. An accommodation space is formed between two opposite sides of the tray. The hard disk is received within the placement area, and the hard disk has a second connection port. The elastic plates are elastically connected to the opposite sides of the tray, respectively. The hard disk is located between the elastic plates. When the tray is moved in a direction so as to direct the first connection port to be plugged with the second connection port, the protrusions respectively push the elastic plates towards the accommodation space so that the hard disk is toollessly fastened between the elastic plates.

According to one or more embodiments, the holding device further includes a connecting rod structure. The connecting rod structure is pivotally connected to the tray and the frame module for moving the tray back and forth in the placement area.

According to one or more embodiments, the frame module further includes a partition frame and a subsidiary bracket disposed between the partition frame and the tray, and including the first plate body and the first lateral plates.

According to one or more embodiments, the connecting rod structure includes a first pivot shaft, a second pivot shaft, a third pivot shaft, a handle lever and a linkage rib. One end of the linkage rib is pivotally connected to one of the opposite sides of the tray through the first pivot shaft, the other end of the linkage rib is pivotally connected to a part of one end of the handle lever through the second pivot shaft, another part of the one end of the handle lever is pivotally connected to one of the first lateral plates of the subsidiary bracket through the third pivot shaft.

According to one or more embodiments, one of the protrusions and the third pivot shaft are disposed on the same one of the first lateral plates.

According to one or more embodiments, the frame module further includes a partition frame having the first plate body and the first lateral plates. The tray is directly disposed on the partition frame.

According to one or more embodiments, the partition frame further includes a second lateral plate. The second lateral plate is disposed on another edge of the first plate body, arranged spaced to the first lateral plates, and disposed at the same one of the opposite sides of the tray with one of the first lateral plates. The connecting rod structure includes a first pivot shaft, a second pivot shaft, a third pivot shaft, a handle lever and a linkage rib. One end of the linkage rib is pivotally connected to one of the opposite sides of the tray through the first pivot shaft, the other end of the linkage rib is pivotally connected to a part of one end of the handle lever through the second pivot shaft, another part of the one end of the handle lever is pivotally connected to the second lateral plate through the third pivot shaft.

According to one or more embodiments, the frame module further includes an external lug. The external lug is detachably disposed on the first plate body, disposed between the partition frame and the tray, arranged spaced to the first lateral plates, and disposed at the same one of the opposite sides of the tray with one of the first lateral plates. The connecting rod structure includes a first pivot shaft, a second pivot shaft, a third pivot shaft, a handle lever and a linkage rib. One end of the linkage rib is pivotally connected to one of the opposite sides of the tray through the first pivot shaft, the other end of the linkage rib is pivotally connected to a part of one end of the handle lever through the second pivot shaft, another part of the one end of the handle lever is pivotally connected to the external lug through the third pivot shaft.

According to one or more embodiments, each of the elastic plates includes an elastic rib and a bump. One end of the elastic rib is a free end, and the bump is formed on one surface of the elastic rib facing towards the hard disk. Each of two opposite sides of the hard disk respectively is formed with a recess. When the hard disk is fastened between the elastic plates, the bumps respectively connect the recesses of the hard disk.

Thus, through the aforementioned structure of the embodiments above, since the hard disk can be fixed to the tray and quickly removed from the tray without using tools, the hard disk is not needed to be fixed on the tray with screws before the tray is assembled to the supporting rack so as to simplify the installation procedure and further save time and cost thereof.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. In the drawings.

DESCRIPTION OF THE EMBODIMENTS

Reference will now be made in detail to the present embodiments of the present disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the present disclosure.

Figure 1:
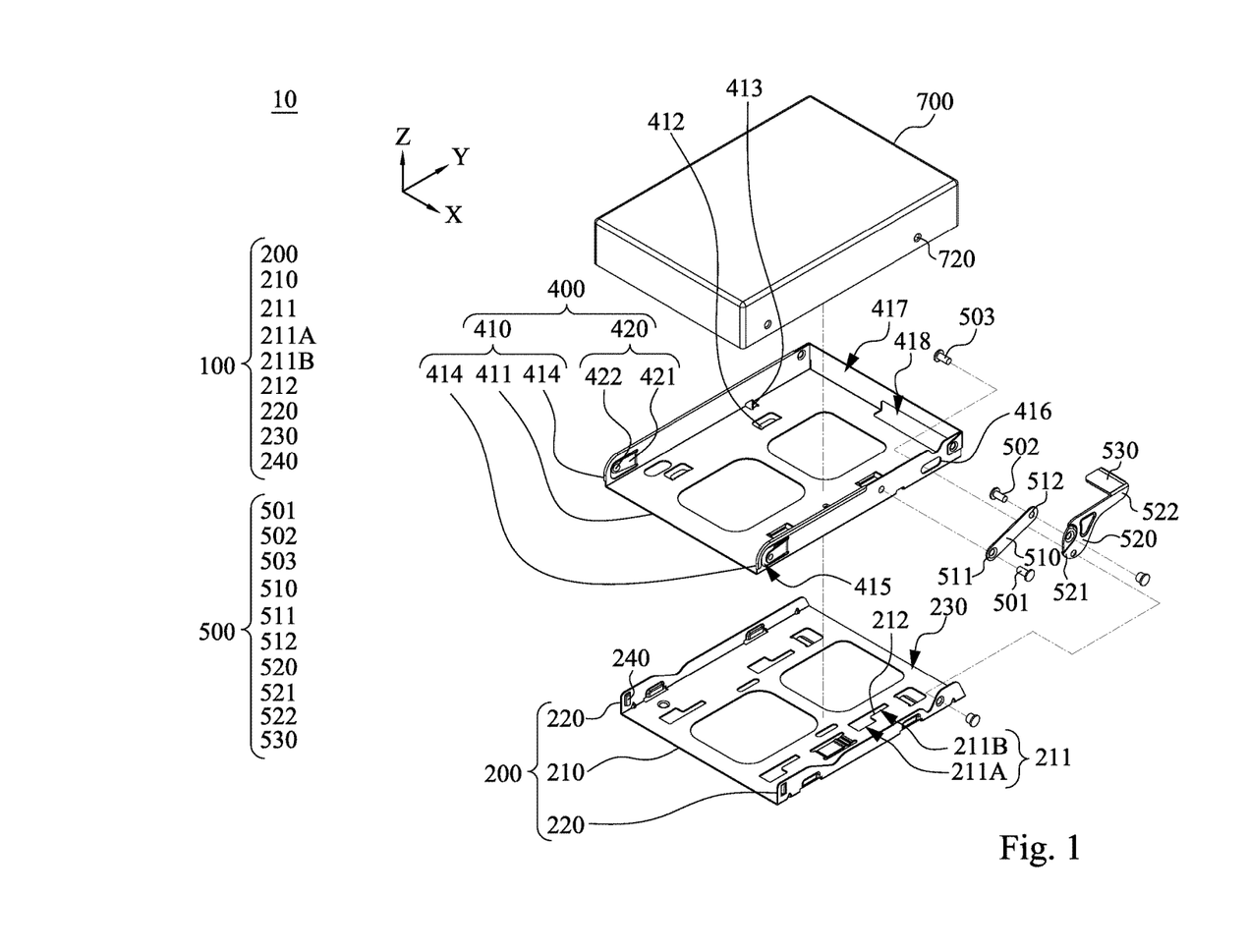
FIG. 1 is an exploded view of a holding device according to one embodiment of the present disclosure.
Figure 2:
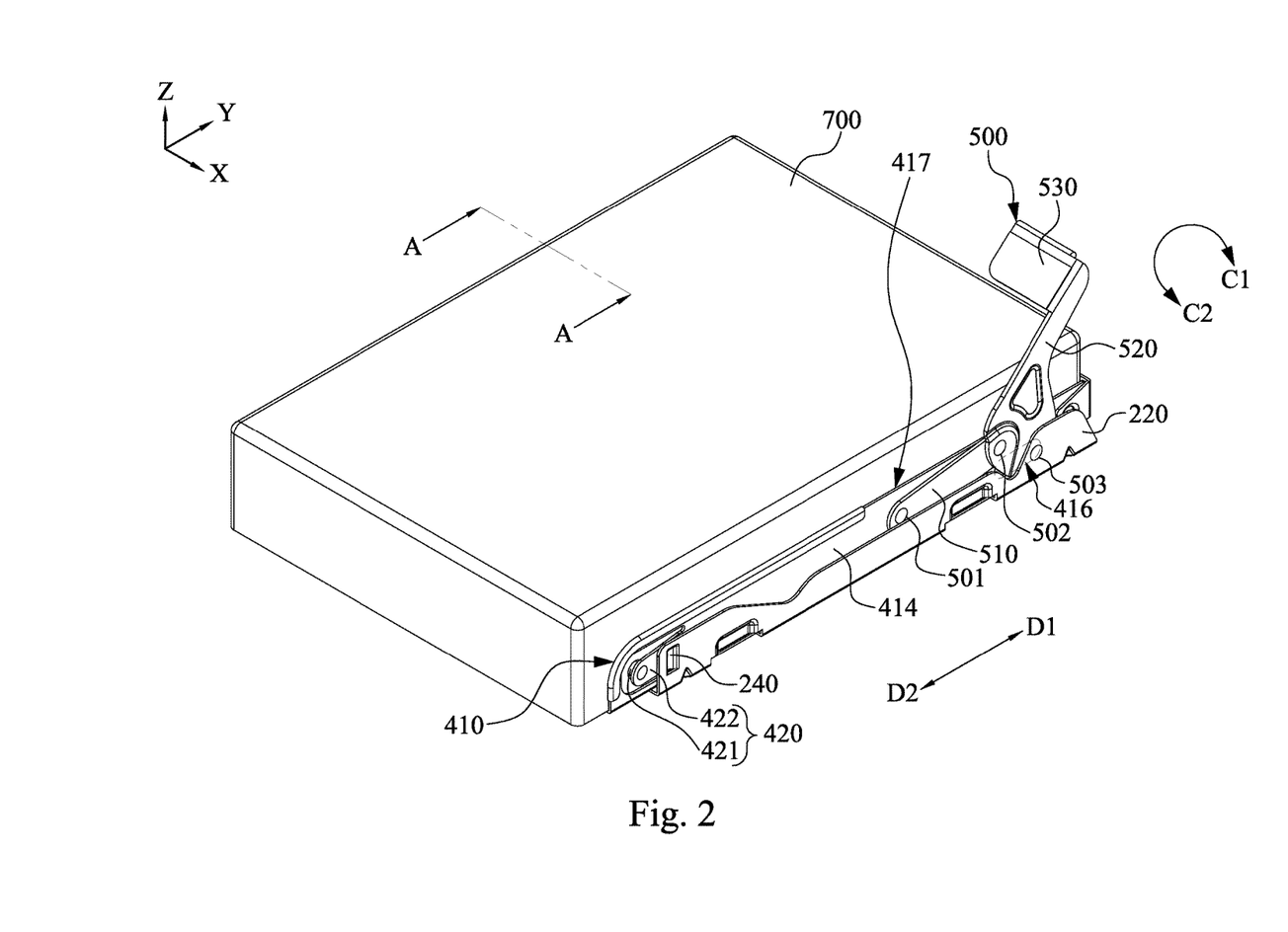
FIG. 2 and FIG. 3 are operational schematic views of the holding device of FIG. 1.
Figure 3:
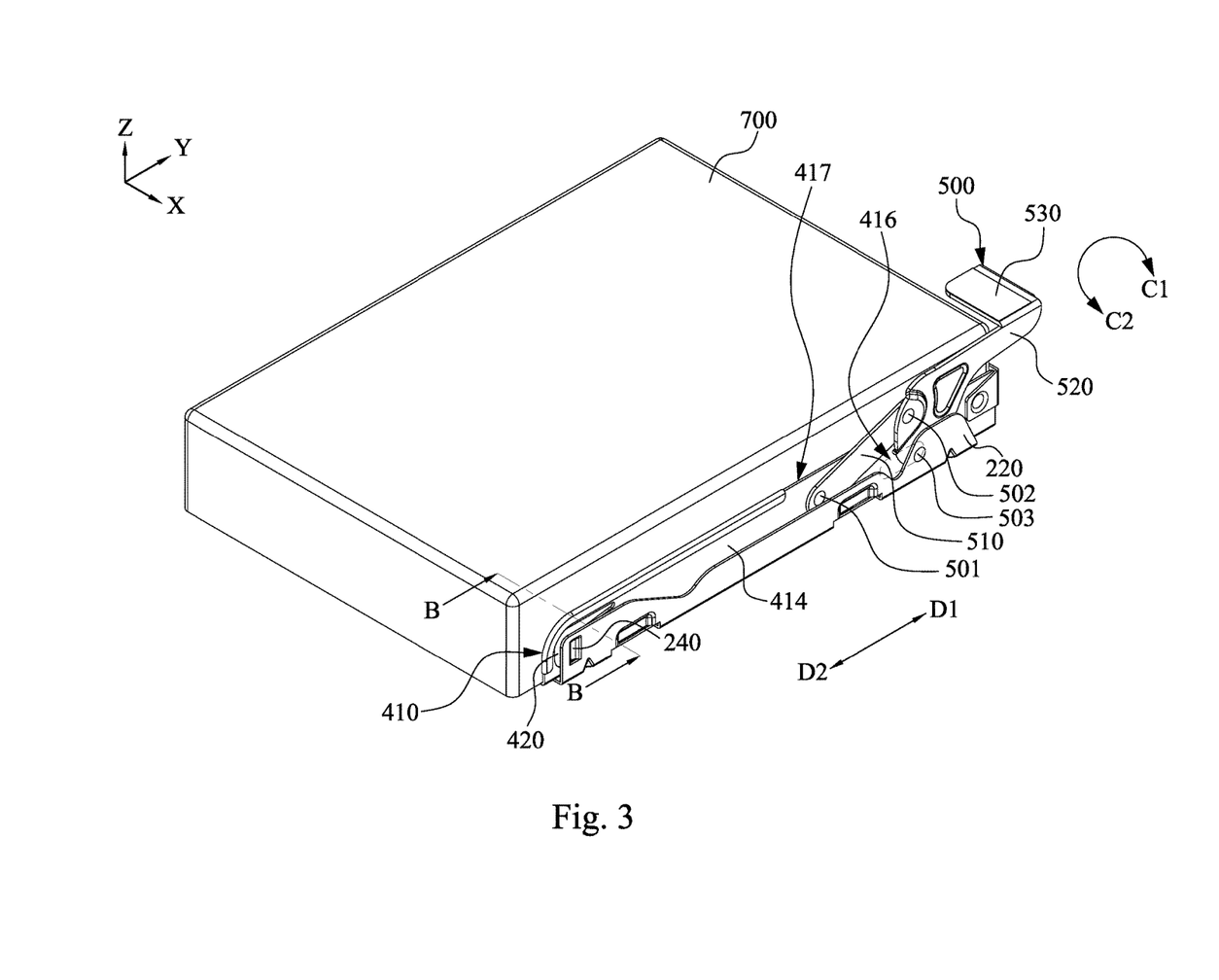

Reference is now made to FIG. 1, in which FIG. 1 is an exploded view of a holding device according to one embodiment of the present disclosure, and FIG. 2 and FIG. 3 are operational schematic views of the holding device of FIG. 1. As shown in FIG. 1 and FIG. 2, in the embodiment, the holding device 10 includes a frame module 100, an accommodation unit 400, and a connecting rod structure 500. The frame module 100 includes a subsidiary bracket 200. The subsidiary bracket 200 includes a first plate body 210 and two first lateral plates 220. The first lateral plates 220 are oppositely disposed on two edges of the first plate body 210, and stand on two edges of the first plate body 210; in other words, the first plate body 210 extends along a plane (e.g., X-Y axis plane), and the first lateral plates 220 are respectively disposed on two opposite sides of the first plate body 210 and extend towards a common direction (e.g., Z axis direction). For example, but not limited to this disclosure, each of the first lateral plates 220 is formed on the respective side of the first plate body 210 by means of sheet metal bending. Therefore, a placement area 230 is collectively defined by the first plate body 210 and the first lateral plates 220.

One surface of each of the first lateral plates 220 facing the placement area 230 is provided with a protrusion 240. The accommodation unit 400 includes a tray 410 and two elastic plates 420. The tray 410 is slidably located within the placement area 230. The tray 410 includes a second plate body 411 and two second lateral plates 414. The second lateral plates 414 are oppositely disposed on two edges of the second plate body 411, and extend towards a common direction (e.g., Z axis direction). An accommodation space 417 is collectively defined by the second plate body 411 and the second lateral plates 414. For example, not for limitations upon disclosure, each of the second lateral plates 414 is formed on the respective side of the second plate body 411 by means of sheet metal bending. The accommodation space 417 is used to receive a load 700 (e.g., hard disk or circuit board) therein. The elastic plates 420 are elastically connected to the second lateral plates 414 of the tray 410, respectively. The connecting rod structure 500 is pivotally connected to the tray 410 and the frame module 100, and is used to move the tray 410 back and forth in the placement area 230 after being operated, that is, after being operated, the tray 410 can be moved linearly in the placement area 230 along a first moving direction D1 and a second moving direction D2 which is opposite to the first moving direction D1.

Therefore, as shown in FIG. 2, when a load 700 is received within the accommodation space 417 of the tray 410, at the moment, the load 700 is not fastened in the accommodation space 417 yet. When the connecting rod structure 500 is operated to linearly move the tray 410 in the first moving direction D1, as shown in FIG. 3, since the elastic plates 420 mentioned above are moved to the protrusions 240 in the first moving direction D1, respectively, the protrusions 240 respectively push the elastic plates 420 towards the accommodation space 417. Therefore, the elastic plates 420 are respectively moved into the accommodation space 417 to press two opposite sides of the load 700, so that the load 700 can be securely clamped by the aforementioned elastic plates 420 which are located at two opposite sides of the load 700. Thus, the load 700 can be toollessly fastened in the accommodation space 417 (FIG. 3).

Conversely, when the connecting rod structure 500 is operated to linearly move the tray 410 in the second moving direction D2, since each of the elastic plates 420 is moved away from the corresponding protrusion 240 in the second moving direction D2, so that the protrusions 240 are in contact with the elastic plates 420 no more so that the load 700 can be released from being clamped by the aforementioned elastic plates 420.

Specifically, as shown in FIG. 1, the connecting rod structure 500 includes a first pivot shaft 501, a second pivot shaft 502, a third pivot shaft 503, a handle lever 520 and a linkage rib 510. The linkage rib 510 is provided with a first end 511 and a second end 512 which are opposite to each other. The handle lever 520 is provided with a third end 521 and a fourth end 522 which are opposite to each other. The first end 511 of the linkage rib 510 is pivotally connected to one of the second lateral plates 414 of the tray 410 through the first pivot shaft 501. The second end 512 of the linkage rib 510 is pivotally connected to a part of the third end 521 of the handle lever 520 through the second pivot shaft 502. Another part of the third end 521 of the handle lever 520 is pivotally connected to one of the first lateral plates 220 of the subsidiary bracket 200 through the third pivot shaft 503, and one of the protrusions 240 and the third pivot shaft 503 are disposed on the same one of the first lateral plates 220. The fourth end 522 of the handle lever 520 is a hand-held part 530 which can be forced to move the handle lever 520 to rotate relative to the linkage rib 510.

Therefore, as shown in FIG. 3, when the hand-held part 530 is pushed to rotate the handle lever 520 relative to the second lateral plates 414 and the linkage rib 510 in a first rotation direction C1, the handle lever 520 pulls the second lateral plates 414 and the linkage rib 510 to move a certain distance in the first moving direction D1.

Conversely, when the hand-held part 530 in FIG. 1 is pulled to rotate the handle lever 520 relative to the second lateral plates 414 and the linkage rib 510 in a second rotation direction C2 opposite to the first rotation direction C1, as shown in FIG. 2, the handle lever 520 pushes the second lateral plates 414 and the linkage rib 510 to reversely move the certain distance in the second moving direction D2. It is noted, the first pivot shaft 501, the second pivot shaft 502 and the third pivot shaft 503 for example, are rivets, screws, or other similar elements. However, the disclosure is not limited to the kinds of the first pivot shaft 501, the second pivot shaft 502 and the third pivot shaft 503.

Furthermore, as shown in FIG. 1 and FIG. 2, the tray 410 is provided with a first elongated opening 416 at one of the second lateral plates 414 of the tray 410, and the third pivot shaft 503 is not only pivoted to the handle lever 520 and the subsidiary bracket 200 through the first elongated opening 416, but also is slidably located in the first elongated opening 416. Thus, when the tray 410 is moved back and forth in the placement area 230, since the third pivot shaft 503 is slidably restrained in the first elongated opening 416, the tray 410 cannot remove from the subsidiary bracket 200.

Figure 4:
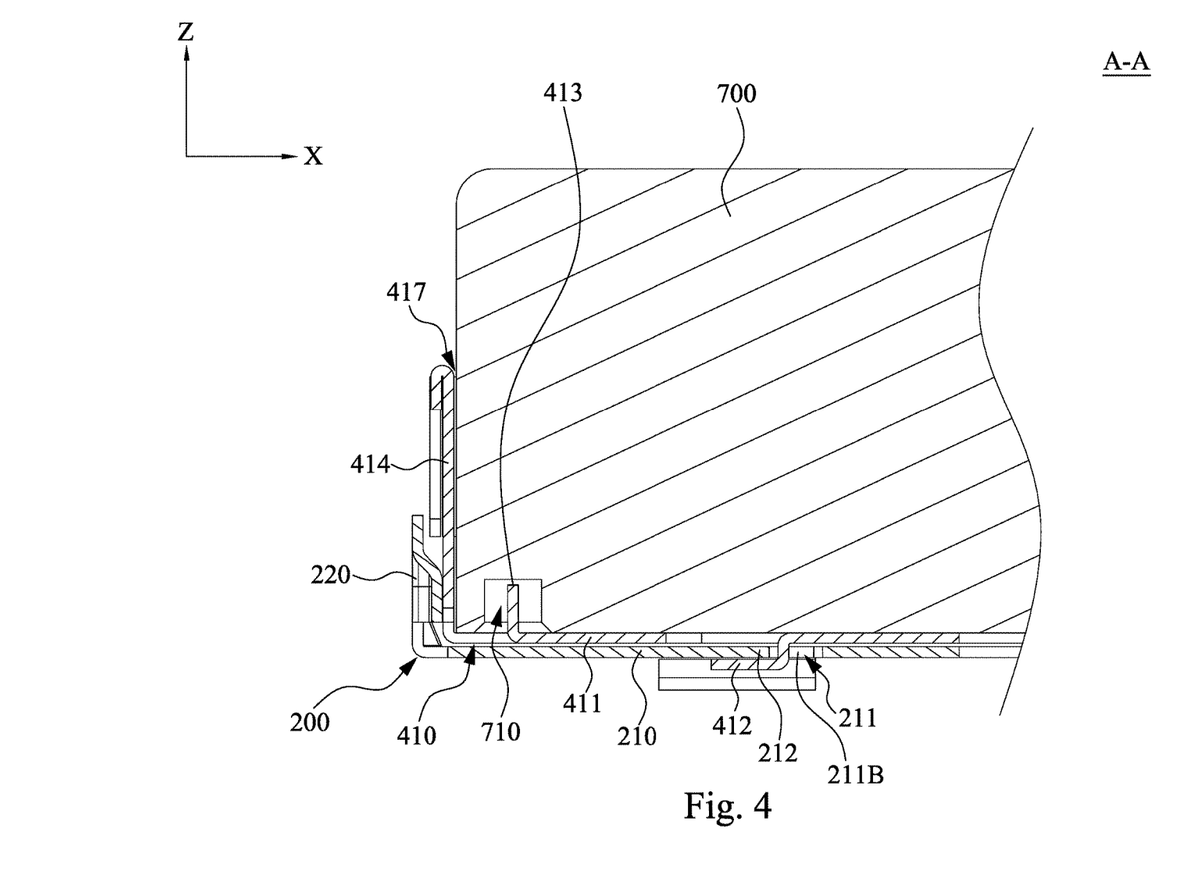
FIG. 4 is a cross sectional view of the holding device of FIG. 2 viewed along a line A-A.

FIG. 4 is a cross sectional view of the holding device 10 of FIG. 2 viewed along a line A-A. As shown in FIG. 1 and FIG. 4, the tray 410 is removably engaged with the first plate body 210. Specifically, the first plate body 210 is provided with at least two (e.g., four in FIG. 1) first holes 211. Each of the first holes 211 is divided into a first hole-area 211A and a second hole-area 211B (FIG. 1). The first hole-area 211A is in communication with the second hole-area 211B, and is greater than the second hole-area 211B. The edge of the second hole-area 211B of each of the first holes 211 of the first plate body 210 is formed with one first fastening portion 212, respectively, that is, each of the first fastening portions 212 can be detachably connected with one of the first holes 211 (FIG. 1). The tray 410 is provided with at least two (e.g., four in FIG. 1) securing ribs 412. Each of the securing ribs 412 is inserted into the first hole-area 211A of one of the first holes 211 first, and then removably engaged with the first fastening portion 212 of the second hole-area 211B.

Thus, refer to FIG. 3 and FIG. 4 as references, when the tray 410 is moved relative to the subsidiary bracket 200 in the first moving direction D1, each of the securing rib 412 is moved to the second hole-area 211B from the first hole-area 211A so that each of the securing rib 412 can be fastened on the first fastening portion 212 of the subsidiary bracket 200. On the contrary, refer to FIG. 2 and FIG. 4 as references, when the tray 410 is moved relative to the subsidiary bracket 200 in the second moving direction D2, each of the securing rib 412 is moved to the first hole-area 211A from the second hole-area 211B of each of the first holes 211 so that each of the securing rib 412 can be removed away from the first fastening portion 212 of the subsidiary bracket 200.

Also, as shown in FIG. 1 and FIG. 4, the tray 410 is further provided with positioning pins 413. The positioning pins 413 are disposed uprightly on the second plate body 411, and the positioning pins 413 respectively extend in a direction facing towards the accommodation space 417 (e.g., Z axis direction). Thus, when the load 700 is placed in the accommodation space 417 of the tray 410 in a direction from top to down (e.g., Z axis direction), due to limiting holes 710 formed on the load 700 are inserted by the positioning pins 413, the load 700 is therefore positioned on the tray 410.

Figure 5:
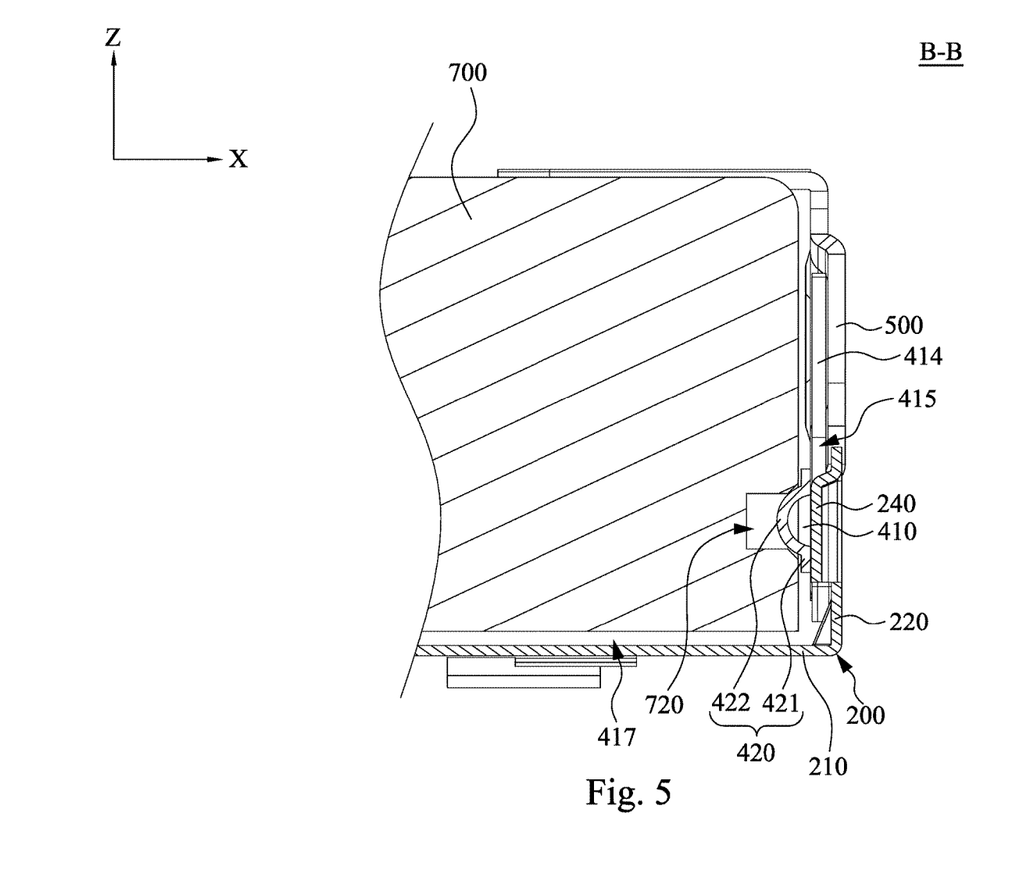
FIG. 5 is a cross sectional view of FIG. 3 of the holding device viewed along a line B-B.

FIG. 5 is a cross sectional view of FIG. 3 of the holding device 10 viewed along a line B-B. As shown in FIG. 1 and FIG. 5, each of the protrusions 240 is monolithically formed on one of the first lateral plates 220. For example, but not limited to this disclosure, each of the protrusions 240 is protruded on one of the first lateral plates 220 by means of stamping forming. Each of the second lateral plates 414 of the tray 410 is formed with a through hole 415, and each of the elastic plates 420 is located within one of the through holes 415. Each of the elastic plates 420 includes an elastic rib 421 and a bump 422. One end of each of the elastic ribs 421 is a free end, and the other end of each of the elastic ribs 421 is monolithically formed on one of the second lateral plates 414. The bump 422 is formed on one surface of the elastic rib 421 facing towards the placement area 230, so as to directly contact the aforementioned load 700 (FIG. 5). Thus, when the tray 410 is moved relative to the subsidiary bracket 200 in the first moving direction D1, because the protrusions 240 respectively push the elastic plates 420, the bumps 422 of the tray 410 respectively extend into (or connected to) the corresponding recesses 720 formed on the opposite sides of the load 700. Therefore, the load 700 is securely fastened between the elastic plates 420. However, the disclosure is not limited thereto, for example, the holding device may not have the aforementioned connecting rod structure, and the tray can be moved by user's hand for fastening the load therein.

Figure 6:
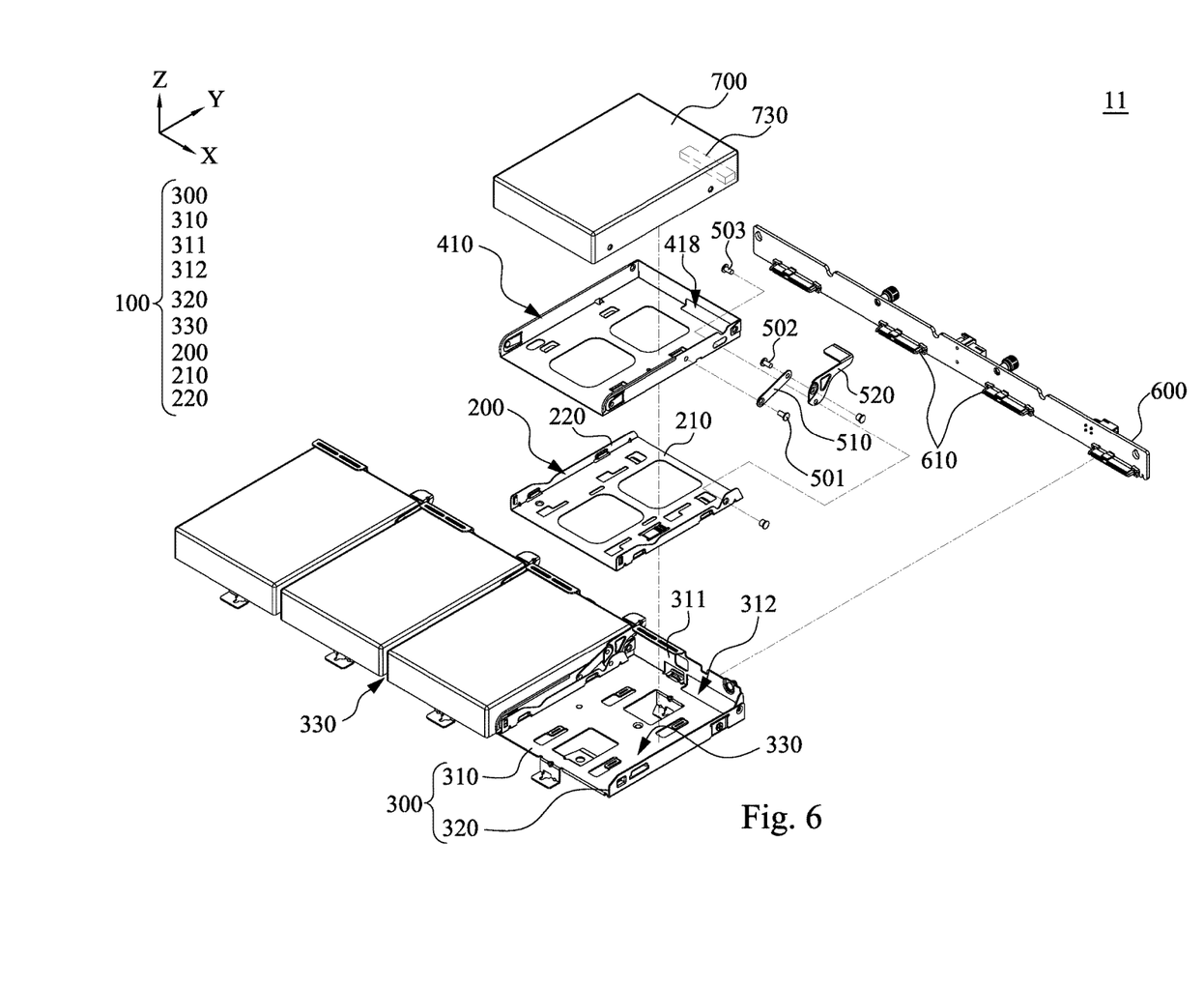
FIG. 6 is an exploded view of a holding device according to one embodiment of the present disclosure.
Figure 7A:
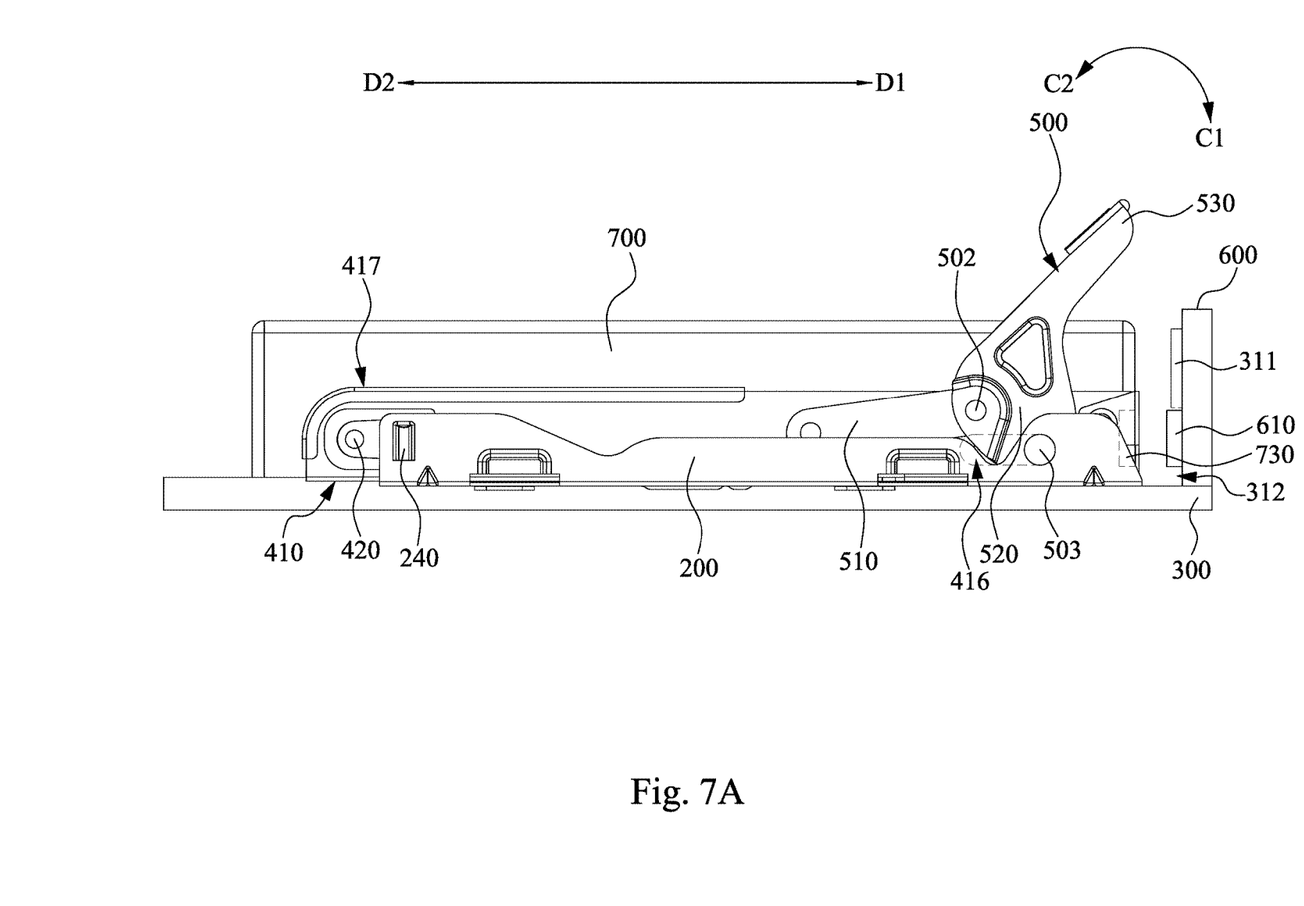
FIG. 7A and FIG. 7B are operational schematic views of the holding device of FIG. 6.
Figure 7B:
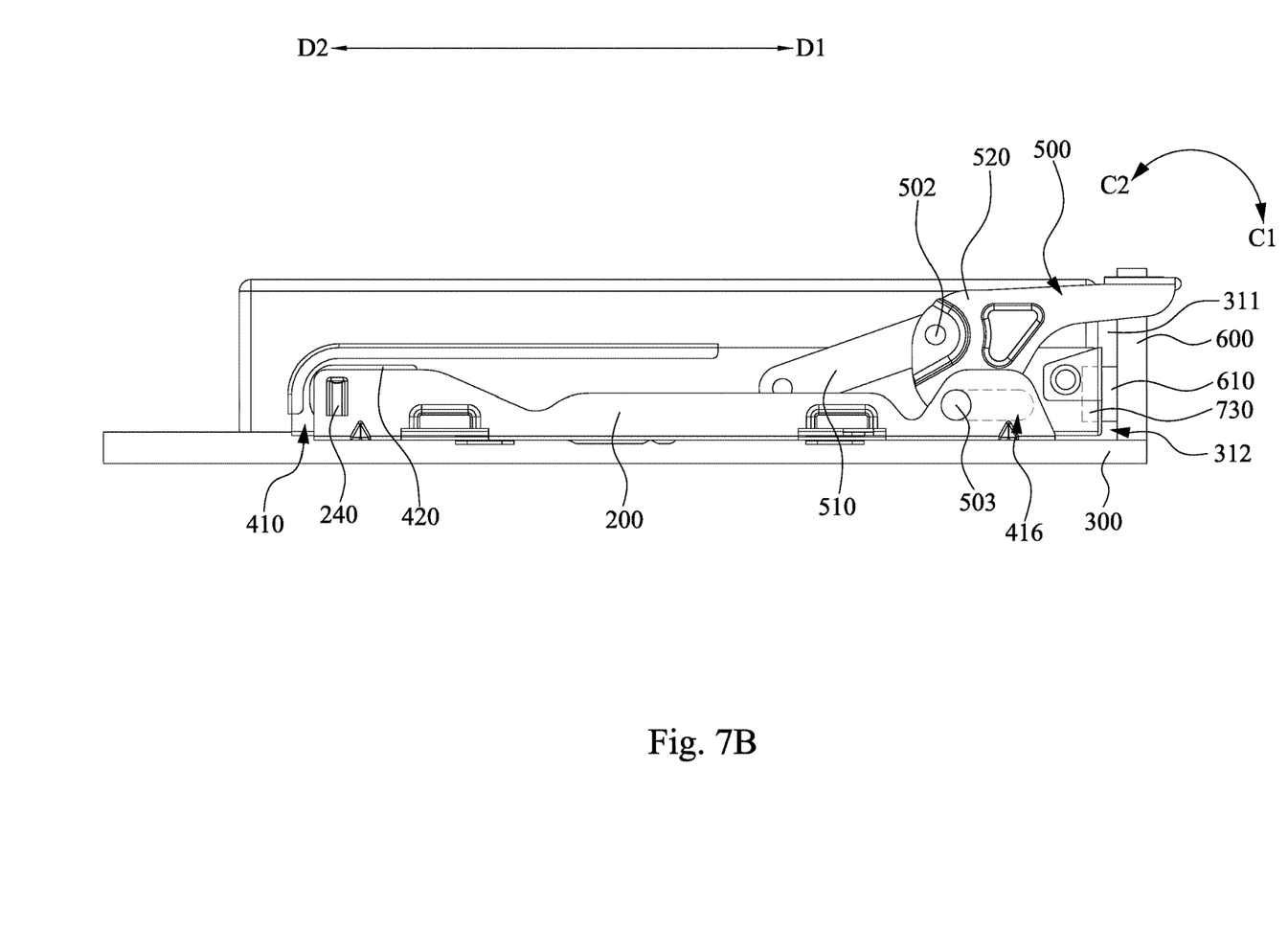

FIG. 6 is an exploded view of a holding device 11 according to one embodiment of the present disclosure, and FIG. 7A and FIG. 7B are operational schematic views of the holding device of FIG. 6. The holding device 11 of FIG. 6 and the holding device 10 of FIG. 1 are substantially the same, in which the same elements are labeled with the same numerical references in FIG. 1 and FIG. 6. However, at least one difference of the holding device 11 of FIG. 6 from the holding device 10 of FIG. 1 is that the frame module 100 in the holding device 11 of FIG. 6 further includes at least one partition frame 300. The partition frame 300 includes a bottom plate 310, a back plate 311 and two side walls 320 which are opposite to each other. The back plate 311 and the side walls 320 are disposed on edges of the bottom plate 310, in other word, the bottom plate 310 extends along a plane (e.g., X-Y axis plane), and the back plate 311 and the side walls 320 are respectively disposed on the first plate body 210, and extend towards a common direction (e.g., Z axis direction). The back plate 311 is connected to the side walls 320. Thus, a placement area 330 is defined by the bottom plate 310, the back plate 311 and the side walls 320 collectively. In the embodiment, a number of the aforementioned subsidiary brackets 200 are fixed and arranged abreast in the placement area 330, and each of the subsidiary brackets 200 is disposed between one of the tray 410 and the partition frame 300.

In addition, in this embodiment, For example, but not limited to this disclosure, the holding device 11 is implemented in a personal computer or server computer field. The holding device 11 further includes at least one circuit backplane 600. The circuit backplane 600 is fixedly disposed on the partition frame 300. The circuit backplane 600 has a plurality of first connection ports 610. The load 700 is an electronic component such as a hard disk or a wiring board. Specifically, the back plate 311 is formed with a number of slots 312, and the circuit backplane 600 is fixedly disposed on one surface of the back plate 311 opposite to the placement area 330. Each of the first connection ports 610 of the circuit backplane 600 extends into the placement area 330 through each of the slots 312, so that each of the first connection ports 610 is electrically connected to one of the second connection ports 730 of the load 700 through an open portion 418 of one of the trays 410.

As shown in FIG. 7A and FIG. 7B, when the connecting rod structure 500 in FIG. 7A is operated to be rotated towards the first rotation direction C1 so as to pull the tray 410 in the first moving direction D1, the second connection port 730 of the load 700 is physically plugged with the first connection port 610 (FIG. 7B). At this moment, the protrusions 240 push the elastic plates 420 towards the accommodation space 417, respectively so that the load 700 can be securely fastened in the accommodation space 417 (FIG. 7B). Conversely, as shown in FIG. 7B, when the connecting rod structure 500 in FIG. 7B is operated to be rotated towards the second rotation direction C2 so as to push the tray 410 in the second moving direction D2, the second connection port 730 of the load 700 is physically removed from the first connection port 610, so that the load 700 can be released from being clamped by the aforementioned elastic plates 420 (FIG. 7A).

Figure 8:
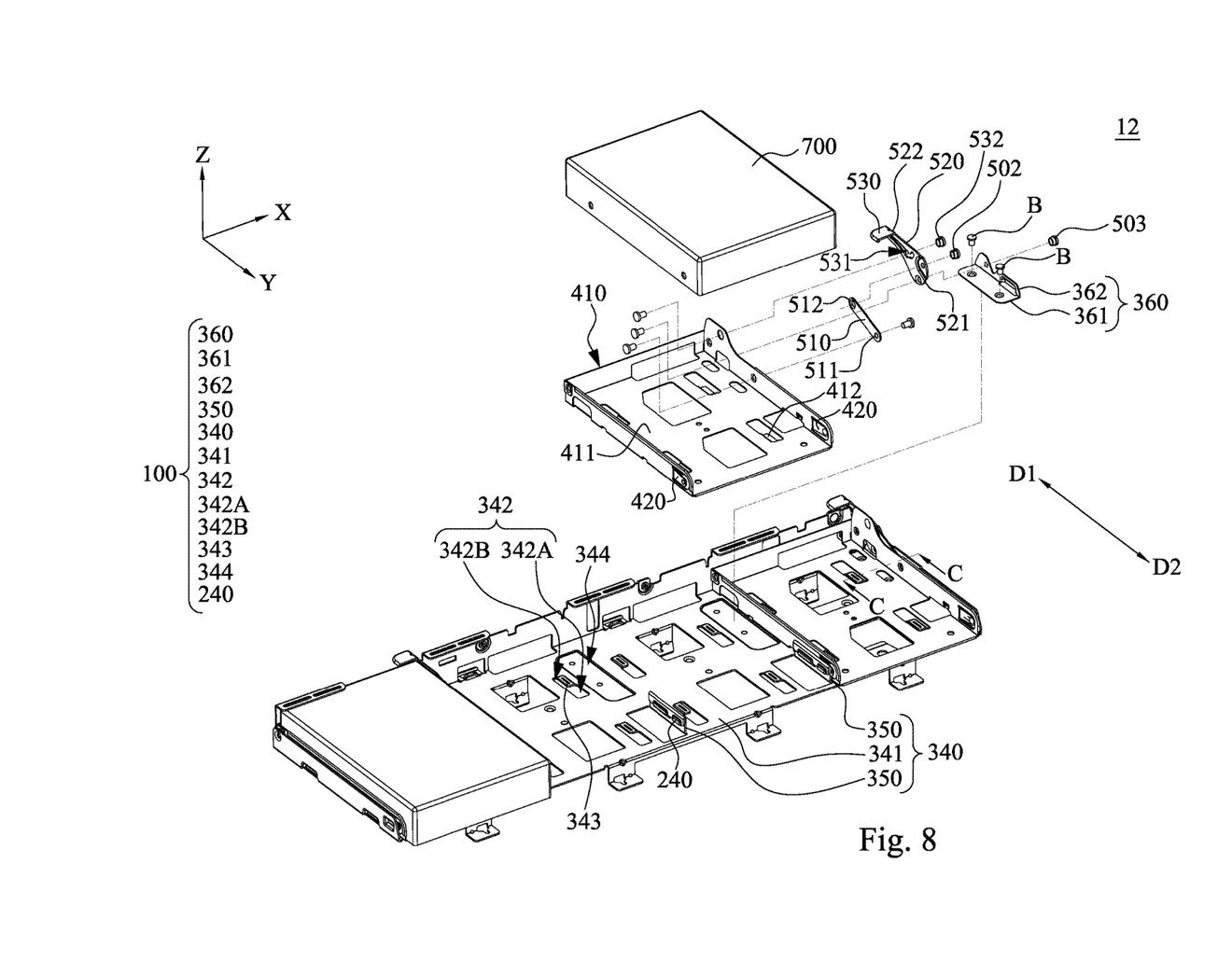
FIG. 8 is a partial exploded view of a holding device according to one embodiment of the present disclosure.

FIG. 8 is a partial exploded view of a holding device 12 according to one embodiment of the present disclosure. The holding device 12 of FIG. 8 and the holding device 11 of FIG. 6 are substantially the same, in which the same elements are labeled with the same numerical references in FIG. 6 and FIG. 8. However, at least one difference of the holding device 12 of FIG. 8 from the holding device 11 of FIG. 6 is that: the frame module 100 in the holding device 12 of FIG. 8 further includes a partition frame 340 and at least one external lug 360, and does not have the subsidiary bracket 200 of FIG. 6. Thus, the tray 410 is directly disposed on the partition frame 340, rather than the subsidiary bracket.

The partition frame 340 includes a first plate body 341 and at least two first lateral plates 350. The external lug 360 is detachably convexly disposed on the first plate body, disposed between the partition frame 340 and the tray 410, and a part of the external lug 360 extends towards a direction (e.g., Z axis direction). The first lateral plates 350 are monolithically formed on the first plate body 341, and respectively extend towards a common direction (e.g., Z axis direction). For example, but not limited to this disclosure, the first lateral plates 350 are formed on two opposite sides of the first plate body 341 by means of sheet metal bending. The external lug 360 is arranged spaced to the first lateral plates 350, and the external lug 360 and one of the first lateral plates 350 are disposed on the same one of two opposite sides of the tray 410.

Also, the first end 511 of the linkage rib 510 is pivotally connected to one of the second lateral plates 414 of the tray 410 through the first pivot shaft 501. The second end 512 of the linkage rib 510 is pivotally connected to a part of the third end 521 of the handle lever 520 through the second pivot shaft 502. Another part of the third end 521 of the handle lever 520 is pivotally connected to the external lug 360 through the third pivot shaft 503, and one of the protrusions 240 and the third pivot shaft 503 are not disposed on the same lateral plate. The fourth end 522 of the handle lever 520 is a hand-held part 530 which can be forced to move the handle lever 520 to rotate relative to the linkage rib 510.

Figure 9:
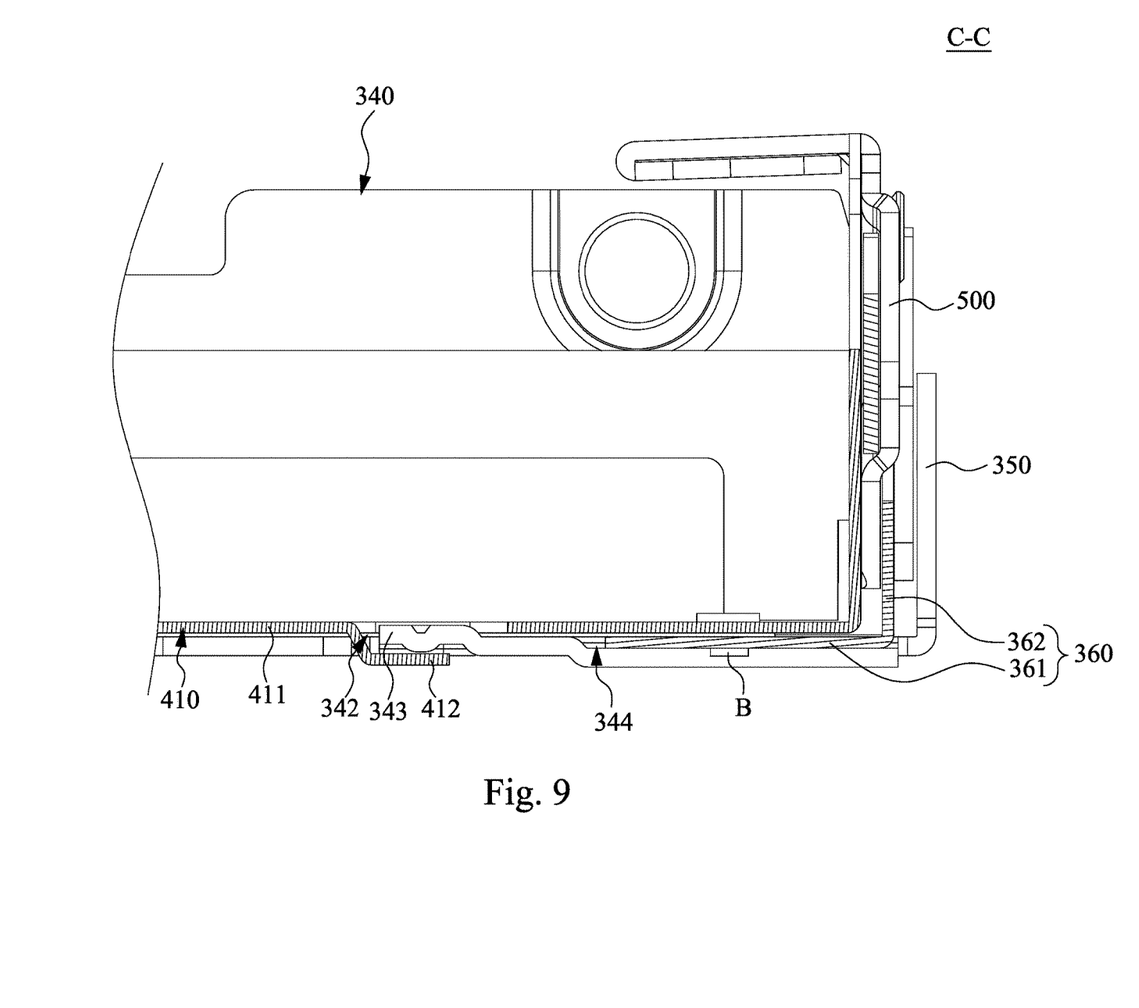
FIG. 9 is a cross sectional view of the holding device of FIG. 8 viewed along a line C-C.

FIG. 9 is a cross sectional view of the holding device of FIG. 8 viewed along a line C-C. As shown in FIG. 8 and FIG. 9, the tray 410 is removably engaged with the partition frame 340. Specifically, the first plate body 341 is further provided with at least two (e.g., four in FIG. 8) second holes 342. Each of the second holes 342 is divided into a third hole-area 342A and a fourth hole-area 342B. The third hole-area 342A is in communication with the fourth hole-area 342B, and is greater than the fourth hole-area 342B. The edge of the fourth hole-area 342B of each of the second holes 342 of the first plate body 341 is formed with one second fastening portion 343, respectively, that is, each of the second fastening portions 343 can be detachably connected with one of the second holes 342. The tray 410 is provided with at least two (e.g., four in FIG. 8) securing ribs 412. Each of the securing ribs 412 is inserted into the third hole-area 342A of one of the second holes 342 first, and then removably engaged with the second fastening portion 343 of the fourth hole-area 342B. Thus, refer to FIG. 7A and FIG. 7B as references, when the tray 410 is moved relative to the partition frame 340 in the first moving direction D1, each of the securing rib 412 is moved to the fourth hole-area 342B from the third hole-area 342A so that each of the securing rib 412 can be fastened on the second fastening portion 343 of the partition frame 340. On the contrary, refer to FIG. 7A and FIG. 7B as references, when the tray 410 is moved relative to the partition frame 340 in the second moving direction D2, each of the securing rib 412 is moved to the third hole-area 342A from the fourth hole-area 342B of each of the second holes 342 so that each of the securing rib 412 can be removed away from the second fastening portion 343 of the partition frame 340.

In addition, in details, the external lug 360 includes a first body 361 and a second body 362. The second body 362 is convexly disposed on the first body 361, that is, the second body 362 extends in the Z axis direction from the first body 361. The first body 361 is configured to be secured on the first plate body 341, for example, the first body 361 is in a sunken recess 344 of the first plate body 341 to be screwed on the first plate body 341 through bolts B. Thus, the overall thickness of the holding device 12 can be reduced. The second body 362 is configured to pivotally connect the third end 521 of the handle lever 520 through the third pivot shaft 503.

Figure 10:
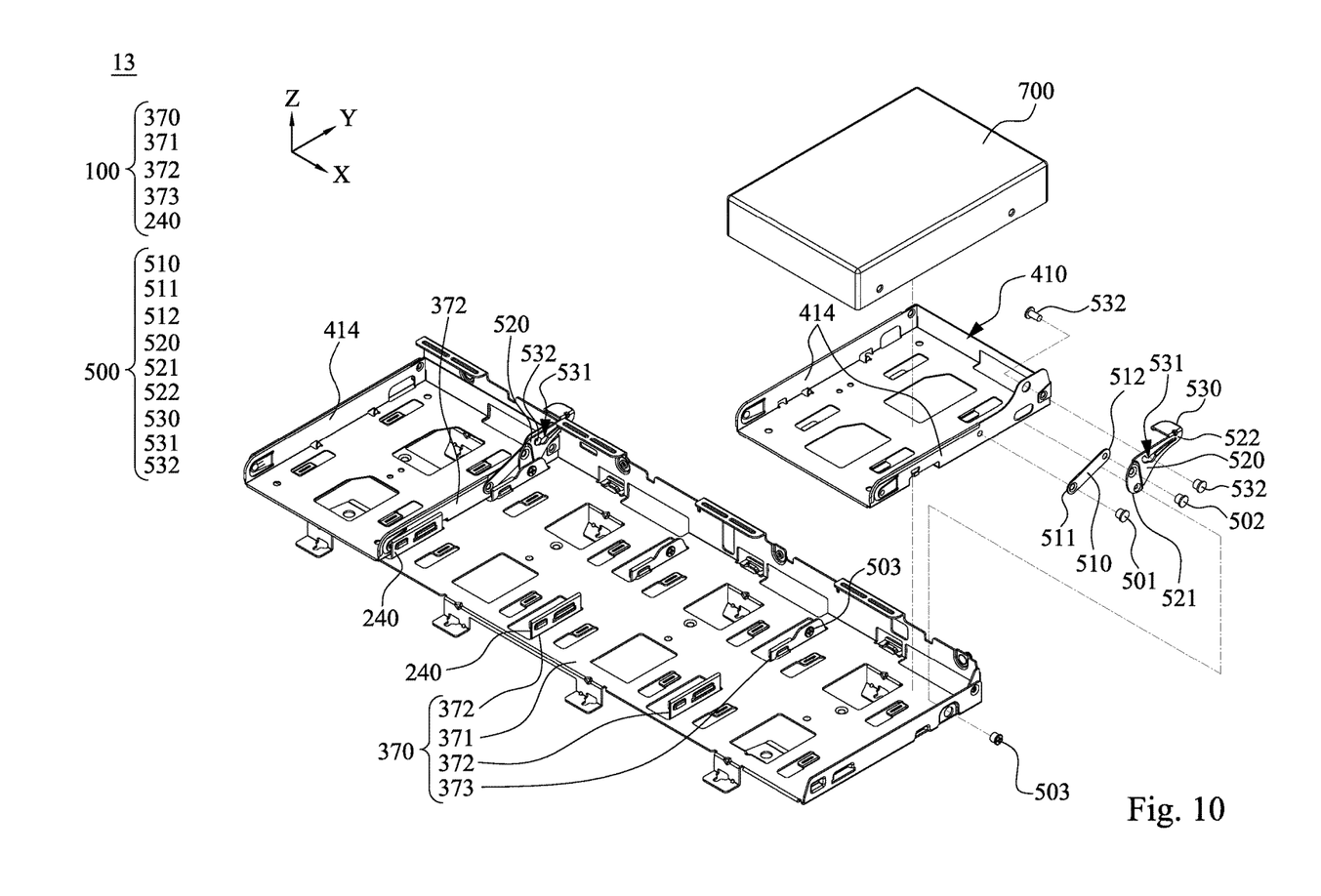
FIG. 10 is a partial exploded view of a holding device according to one embodiment of the present disclosure.

FIG. 10 is a partial exploded view of a holding device 13 according to one embodiment of the present disclosure. The holding device 13 of FIG. 10 and the holding device 12 of FIG. 8 are substantially the same, in which the same elements are labeled with the same numerical references in FIG. 8 and FIG. 10. However, at least one difference between the holding device 13 of FIG. 10 from the holding device 12 of FIG. 8 is that: the frame module 100 in the holding device 13 of FIG. 10 only includes a partition frame 370, and does not have the external lug 360 in FIG. 8 and the subsidiary bracket 200 of FIG. 6. Thus, the tray 410 is directly disposed on the partition frame 370. The partition frame 370 includes a first plate body 371, at least two first lateral plates 372 and a second lateral plate 373. The second lateral plate 373 is monolithically formed on the first plate body 371 with the first lateral plates 372. The second lateral plate 373 is arranged spaced to the first lateral plates 372, and is disposed at the same one of the opposite sides of the tray 410 with one of the first lateral plates 372. In other words, the second lateral plate 373 and the first lateral plates 372 respectively extend towards a common direction (e.g., Z axis direction) from the first plate body 371. For example, but not limited to this disclosure, the second lateral plate 373 and the first lateral plates 372 are respectively formed on the sides of the first plate body 371 by means of sheet metal bending.

Also, the first end 511 of the linkage rib 510 is pivotally connected to one of the second lateral plates 414 of the tray 410 through the first pivot shaft 501. The second end 512 of the linkage rib 510 is pivotally connected to a part of the third end 521 of the handle lever 520 through the second pivot shaft 502. Another part of the third end 521 of the handle lever 520 is pivotally connected to the second lateral plate 373 through the third pivot shaft 503, and one of the protrusions 240 and the third pivot shaft 503 are not disposed on the same lateral plate. Since the third pivot shaft 503 is, for example, a screw which has functions of locking and pivoting, the third pivot shaft 503 is rotatably locked to the handle lever 520. The fourth end 522 of the handle lever 520 is a hand-held part 530 which can be forced to move the handle lever 520 to rotate relative to the linkage rib 510.

In addition, in the embodiment, since the opposite sides of the first lateral plates 372 have protrusions 240 respectively, the loads 700 in the placement areas 230 can be respectively fastened by those protrusions 240 so as to save material cost.

In the embodiment, as shown in FIG. 6, FIG. 8 and FIG. 10, the handle lever 520 is provided with a second elongated opening 531 and a fixing shaft 532. The fixing shaft 532 is connected to one of the second lateral plates 414 of the tray 410, and is slidably located in the second elongated opening 531. In this way, the handle lever 520 can be protected to rotate under a certain range without being damaged by excessive force.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A holding device, comprising:
    a frame module comprising a first plate body and two first lateral plates that are disposed on two edges the first plate body oppositely, wherein a placement area is defined by the first plate body and the two first lateral plates collectively, and one surface of each of the two first lateral plates which faces towards the placement area is provided with a protrusion portion; and
an accommodation unit comprising:
a tray that is slidably disposed within the placement area, wherein an accommodation space is formed between two opposite sides of the tray; and
two elastic plates that are elastically connected to the two opposite sides of the tray, respectively,
wherein when a load is received within the accommodation space and the tray is moved in a direction, the protrusions of the two first lateral plates respectively push the two elastic plates towards the accommodation space so that the load is toollessly fastened between the two elastic plates.

2. The holding device of claim 1, further comprising:
a connecting rod structure pivotally connected to the tray and the frame module for moving the tray back and forth in the placement area.

3. The holding device of claim 2, wherein the frame module further comprises:
a subsidiary bracket supporting the tray, and comprising the two first lateral plates, wherein the two opposite sides of the tray are disposed between the two first lateral plates of the subsidiary bracket.

4. The holding device of claim 3, wherein the connecting rod structure comprises a first pivot shaft, a second pivot shaft, a third pivot shaft, a handle lever and a linkage rib, one end of the linkage rib is pivotally connected to one of the two opposite sides of the tray through the first pivot shaft, the other end of the linkage rib is pivotally connected to a part of one end of the handle lever through the second pivot shaft, another part of the one end of the handle lever is pivotally connected to one of the two first lateral plates of the subsidiary bracket through the third pivot shaft.

5. The holding device of claim 4, wherein the frame module further comprises:
a partition frame supporting the subsidiary bracket, and fixedly connected to the subsidiary bracket, wherein the subsidiary bracket is located between the partition frame and the tray.

6. The holding device of claim 4, wherein one of the protrusions and the third pivot shaft are disposed on the same one of the two first lateral plates.

7. The holding device of claim 2, wherein the frame module further comprises:
a partition frame comprising the first plate body and the two first lateral plates, wherein the tray is directly disposed on the partition frame.

8. The holding device of claim 7, wherein the partition frame further comprises a second lateral plate, the second lateral plate is disposed on another edge of the first plate body, monolithically formed on the first plate body with the two first lateral plates, arranged spaced to the two first lateral plates, and disposed at the same one of the two opposite sides of the tray with one of the two first lateral plates; and
the connecting rod structure comprises a first pivot shaft, a second pivot shaft, a third pivot shaft, a handle lever and a linkage rib, one end of the linkage rib is pivotally connected to one of the two opposite sides of the tray through the first pivot shaft, the other end of the linkage rib is pivotally connected to a part of one end of the handle lever through the second pivot shaft, another part of the one end of the handle lever is pivotally connected to the second lateral plate through the third pivot shaft.

9. The holding device of claim 8, wherein the frame module further comprises:
an external lug detachably disposed on the first plate body, disposed between the partition frame and the tray, arranged spaced to the two first lateral plates, and disposed at the same one of the two opposite sides of the tray with one of the two first lateral plates; and
the connecting rod structure comprises a first pivot shaft, a second pivot shaft, a third pivot shaft, a handle lever and a linkage rib, one end of the linkage rib is pivotally connected to one of the two opposite sides of the tray through the first pivot shaft, the other end of the linkage rib is pivotally connected to a part of one end of the handle lever through the second pivot shaft, another part of the one end of the handle lever is pivotally connected to the external lug through the third pivot shaft.

10. The holding device of claim 1, wherein each of the two elastic plates comprises an elastic rib and a bump, one end of the elastic rib is a free end, and the bump is formed on one surface of the elastic rib facing towards the accommodation space,
wherein, when the load is fastened between the two elastic plates, the bumps directly connect two opposite sides of the load.

11. A holding device, comprising:
a frame module comprising a first plate body and two first lateral plates disposed on two edges the first plate body oppositely, wherein the first plate body and the two first lateral plates collectively define a placement area, and one surface of each of the two first lateral plates which faces towards the placement area is provided with a protrusion portion;
a circuit backplane fixedly disposed on the frame module, and having a first connection port; and
an accommodation unit, comprising:
a tray slidably located within the placement area, and an accommodation space which is formed between two opposite sides of the tray;
a hard disk received within the placement area, and having a second connection port; and
two elastic plates elastically connected to the two opposite sides of the tray, respectively, wherein the hard disk is located between the two elastic plates,
wherein when the tray is moved in a direction so as to direct the first connection port to be plugged with the second connection port, the protrusions respectively push the two elastic plates towards the accommodation space so that the hard disk is toollessly fastened between the two elastic plates.

12. The holding device of claim 11, further comprising:
a connecting rod structure pivotally connected to the tray and the frame module for moving the tray back and forth in the placement area.

13. The holding device of claim 12, wherein the frame module further comprises:
a partition frame; and
a subsidiary bracket disposed between the partition frame and the tray, and comprising the first plate body and the two first lateral plates.

14. The holding device of claim 13, wherein the connecting rod structure comprises a first pivot shaft, a second pivot shaft, a third pivot shaft, a handle lever and a linkage rib, one end of the linkage rib is pivotally connected to one of the two opposite sides of the tray through the first pivot shaft, the other end of the linkage rib is pivotally connected to a part of one end of the handle lever through the second pivot shaft, another part of the one end of the handle lever is pivotally connected to one of the two first lateral plates of the subsidiary bracket through the third pivot shaft.

15. The holding device of claim 14, wherein one of the protrusions and the third pivot shaft are disposed on the same one of the two first lateral plates.

16. The holding device of claim 12, wherein the frame module further comprises a partition frame comprising the first plate body and the two first lateral plates, wherein the tray is directly disposed on the partition frame.

17. The holding device of claim 16, wherein the partition frame further comprises a second lateral plate, the second lateral plate is disposed on another edge of the first plate body, arranged spaced to the first lateral plates, and disposed at the same one of the two opposite sides of the tray with one of the two first lateral plates; and the connecting rod structure comprises a first pivot shaft, a second pivot shaft, a third pivot shaft, a handle lever and a linkage rib, one end of the linkage rib is pivotally connected to one of the two opposite sides of the tray through the first pivot shaft, the other end of the linkage rib is pivotally connected to a part of one end of the handle lever through the second pivot shaft, another part of the one end of the handle lever is pivotally connected to the second lateral plate through the third pivot shaft.

18. The holding device of claim 16, wherein the frame module further comprises:

an external lug detachably disposed on the first plate body, disposed between the partition frame and the tray, arranged spaced to the two first lateral plates, and disposed at the same one of the two opposite sides of the tray with one of the two first lateral plates; and the connecting rod structure comprises a first pivot shaft, a second pivot shaft, a third pivot shaft, a handle lever and a linkage rib, one end of the linkage rib is pivotally connected to one of the two opposite sides of the tray through the first pivot shaft, the other end of the linkage rib is pivotally connected to a part of one end of the handle lever through the second pivot shaft, another part of the one end of the handle lever is pivotally connected to the external lug through the third pivot shaft.

19. The holding device of claim 11, wherein each of the two elastic plates comprises an elastic rib and a bump, one end of the elastic rib is a free end, and the bump is formed on one surface of the elastic rib facing towards the hard disk, each of two opposite sides of the hard disk respectively is formed with a recess, wherein, when the hard disk is fastened between the two elastic plates, the bumps respectively connect the recesses of the hard disk.

* * * * *